United States Patent
Cho et al.

(10) Patent No.: US 11,030,480 B2
(45) Date of Patent: Jun. 8, 2021

(54) ELECTRONIC DEVICE FOR HIGH-SPEED COMPRESSION PROCESSING OF FEATURE MAP OF CNN UTILIZING SYSTEM AND CONTROLLING METHOD THEREOF

(71) Applicant: SAMSUNG ELECTRONICS CO., LTD., Suwon-si (KR)

(72) Inventors: Insang Cho, Suwon-si (KR); Wonjae Lee, Suwon-si (KR); Chanyoung Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 94 days.

(21) Appl. No.: 16/556,378

(22) Filed: Aug. 30, 2019

(65) Prior Publication Data
US 2020/0074223 A1     Mar. 5, 2020

(30) Foreign Application Priority Data

Aug. 31, 2018 (KR) .................. 10-2018-0103933
Jul. 5, 2019  (KR) .................. 10-2019-0081288

(51) Int. Cl.
*G06K 9/00* (2006.01)
*G06K 9/62* (2006.01)
(Continued)

(52) U.S. Cl.
CPC ......... *G06K 9/6232* (2013.01); *G06K 9/4647* (2013.01); *G06K 9/6256* (2013.01);
(Continued)

(58) Field of Classification Search
CPC .. G06K 9/6232; G06K 9/6256; G06K 9/4647;
G06K 9/34; G06K 9/4628; G06K 9/52;
G06K 9/6267; G06K 9/6271; G06K 9/66;
G06K 9/6255; G06K 9/6274; G06K 9/00624; G06K 9/00744; G06K 9/00765;
(Continued)

(56) References Cited

U.S. PATENT DOCUMENTS 7,864,863 B2   1/2011  Francois et al.
8,265,405 B2   9/2012  Sugimoto
(Continued)

FOREIGN PATENT DOCUMENTS

JP   3944225 B2      7/2007
KR   10-1094433 B1  12/2011
(Continued)

OTHER PUBLICATIONS

Erdeljan, Andrea et al., "IP Core for Efficient Zero-Run Length Compression of CNN Feature Maps", 25th Telecommunications FORUM TELFOR 2017, IEEE, Nov. 21, 2017, pp. 1-4, XP033293503.
(Continued)

*Primary Examiner* — Jose L Couso
(74) *Attorney, Agent, or Firm* — Sughrue Mion, PLLC

(57) ABSTRACT

An electronic device and a method for controlling the same include inputting an input image into an artificial intelligence model, acquiring a feature map for the input image, converting the feature map through a lookup table corresponding to the feature map, and storing the converted feature map by compressing the feature map through a compression mode corresponding to the feature map.

18 Claims, 18 Drawing Sheets

(51) Int. Cl.
  *H04N 19/103* (2014.01)
  *H04N 19/182* (2014.01)
  *H04N 19/136* (2014.01)
  *G06K 9/46* (2006.01)
  *G06T 1/60* (2006.01)

(52) U.S. Cl.
  CPC ............ *G06T 1/60* (2013.01); *H04N 19/103* (2014.11); *H04N 19/136* (2014.11); *H04N 19/182* (2014.11)

(58) Field of Classification Search
  CPC .. G06K 9/00791; G06K 9/36; G06K 2209/19; H04N 19/103; H04N 19/182; H04N 19/136; H04N 19/46; H04N 19/11; H04N 19/42; H04N 19/426; H04N 19/184; H04N 19/597; H04N 19/61; H04N 19/62; H04N 19/119; H04N 19/13; H04N 19/132; H04N 19/159; H04N 19/172; H04N 19/176; H04N 19/187; H04N 19/192; H04N 19/51; H04N 19/60; H04N 19/63; H04N 19/91; G06T 1/60; G06T 1/20; G06T 9/002; G06T 15/005; G06T 2207/20081; G06T 2207/20084; G06T 2207/30148; G06T 2207/20164; G06T 7/0004; G06T 7/40; G06T 7/10; G06T 11/001; G06T 5/50; G06T 5/20; G06T 3/40; G06N 3/0454; G06N 3/02; G06N 3/04; G06N 3/08–088; G06N 3/0445; G06N 3/0472; G06N 20/00–20; G06F 3/0482; G06F 13/10
  See application file for complete search history.

(56) References Cited

U.S. PATENT DOCUMENTS

| | | | |
|---|---|---|---|
| 9,805,310 B2* | 10/2017 | Jeffries | G06F 16/284 |
| 9,953,236 B1 | 4/2018 | Huang et al. | |
| 10,043,113 B1 | 8/2018 | Kim et al. | |
| 10,097,851 B2* | 10/2018 | Lee | H04N 19/167 |
| 10,452,979 B2 | 10/2019 | Park | |
| 2005/0018768 A1* | 1/2005 | Mabey | H04N 19/115 375/240.2 |
| 2016/0162782 A1 | 6/2016 | Park | |
| 2016/0163035 A1 | 6/2016 | Chang et al. | |
| 2016/0255371 A1 | 9/2016 | Heo et al. | |
| 2016/0350645 A1 | 12/2016 | Brothers et al. | |
| 2018/0114071 A1 | 4/2018 | Wang | |
| 2018/0189981 A1 | 7/2018 | Singh et al. | |
| 2018/0204336 A1 | 7/2018 | Fang et al. | |
| 2018/0247180 A1* | 8/2018 | Cheng | G06K 9/6243 |
| 2018/0269897 A1* | 9/2018 | Blaettler | H04N 19/91 |
| 2018/0300905 A1* | 10/2018 | Johnston | H04N 19/137 |
| 2019/0190538 A1* | 6/2019 | Park | G06N 3/063 |
| 2019/0197420 A1* | 6/2019 | Singh | G06F 13/28 |
| 2019/0311202 A1* | 10/2019 | Lee | G06K 9/6256 |
| 2020/0134461 A1* | 4/2020 | Chai | G06N 3/04 |
| 2020/0349673 A1* | 11/2020 | Yoo | G06N 3/0454 |

FOREIGN PATENT DOCUMENTS

| | | |
|---|---|---|
| KR | 10-2016-0034814 A | 3/2016 |
| KR | 10-2016-0069834 A | 6/2016 |
| KR | 10-2016-0072120 A | 6/2016 |

OTHER PUBLICATIONS

Yu, Xiyu et al., "On Compressing Deep Models by Low Rank and Sparse Decomposition", 2017 IEEE Conference on Computer Vision and Pattern Recognition, Proceedings, IEEE Computer Society, US, Jul. 21, 2017, pp. 67-76, XP033249341.

Ferreira, Paulo J. S. G. et al., "Why Does Histogram Packing Improve Lossless Compression Rates?", IEEE Signal Processing Letters, vol. 9, No. 8, Aug. 1, 2002, pp. 259-261, XP011428411.

Santos, Joao M. et al., "Compression of medical images using MRP with bi-directional prediction and histogram packing", 2016 Picture Coding Symposium (PCS), IEEE, Dec. 4, 2016, pp. 1-5, XP033086941.

Jallouli, Souha et al., "An Adaptive Block-Based Histogram Packing for Improving the Compression Performance of JPEG-LS for Images with Sparse and Locally Sparse Histograms", Springer International Publishing AG, Springer Nature 2018, pp. 63-71, XP047477011.

Guo, Li et al., "Lossless Embedded Compression Using Multi-mode DPCM & Averaging Prediction for HEVC-like Video Codec," 21st European Signal Processing Conference (EUSIPCO 2013), EURASIP, Sep. 9, 2013, pp. 1-5, XP032593657.

Search Report dated Apr. 22, 2020 by the European Patent Office in counterpart European Patent Application No. 19769984.6.

Justin Johnson et al. "Perceptual Losses for Real-Time Style Transfer and Super-Resolution" Department of Computer Science, Stanford University, Mar. 27, 2016, (pp. 1-18).

Communication (PCT/ISA/210) dated Dec. 18, 2019 by the International Searching Authority in counterpart International Patent Application No. PCT/KR2019/011148.

Communication (PCT/ISA/237) dated Dec. 18, 2019 by the International Searching Authority in counterpart International Patent Application No. PCT/KR2019/011148.

Communication dated Apr. 29, 2021 issued by the Indian Patent Office in counterpart Indian Application No. 201947043038.

* cited by examiner

<BEFORE CONVERSION>

<AFTER CONVERSION>

FIG. 8A

| PMODE | Description |
|---|---|
| 0 | Pred_x = a+b−c |
| 1 | Pred_x = a |
| 2 | Pred_x = b |
| 3 | Pred_x = (a+b+1)>>1 |
| 4 | Pred_x = c |

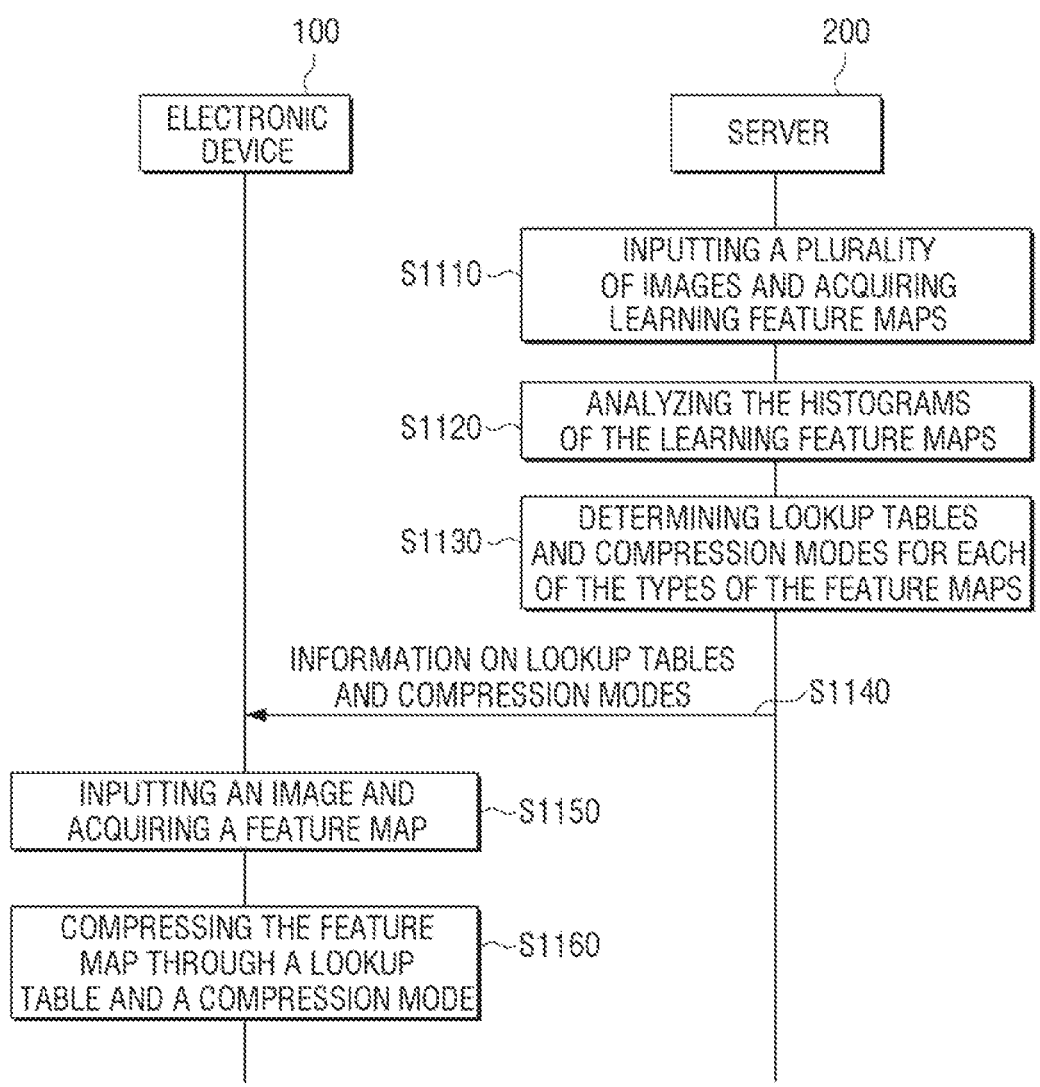

FIG. 13A
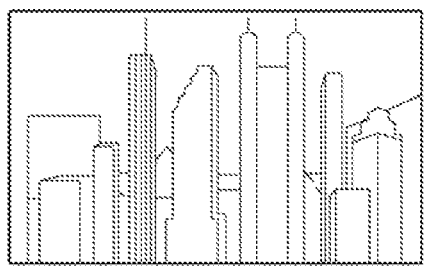
chicago.jpg
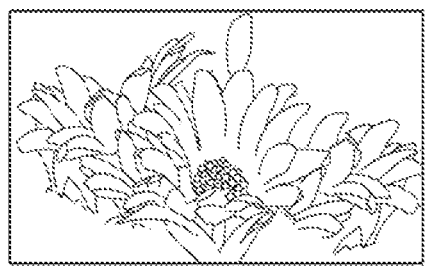
Chrysanthemum.jpg
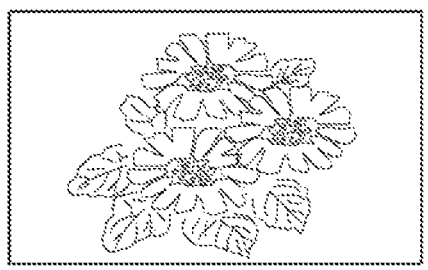
Hydrangeas.jpg
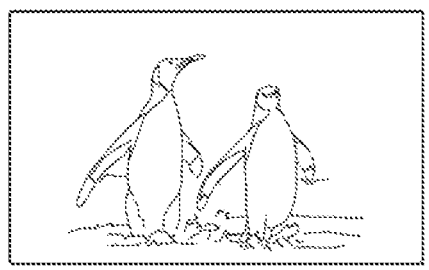
Penguins.jpg

FIG. 13B

| layer | (AFTER APPLICATION/BEFORE APPLICATION)[%] | | | |
|---|---|---|---|---|
| | chicago | Chrysanthemum | Hydrangeas | Penguins |
| 0 | 4.60 | 3.87 | 4.73 | 4.94 |
| 1 | 9.53 | 9.58 | 10.05 | 10.74 |
| 2 | 36.14 | 36.39 | 37.06 | 37.29 |
| 3 | 17.56 | 18.08 | 18.25 | 18.29 |
| 4 | 18.85 | 19.02 | 19.10 | 18.93 |
| Avr. | 17.34 | 17.39 | 17.84 | 18.04 |

ELECTRONIC DEVICE FOR HIGH-SPEED COMPRESSION PROCESSING OF FEATURE MAP OF CNN UTILIZING SYSTEM AND CONTROLLING METHOD THEREOF

CROSS-REFERENCE TO RELATED APPLICATION(S)

This application is based on and claims priority under 35 U.S.C. § 119(a) from Korean Patent Application No. 10-2018-0103933, filed on Aug. 31, 2018, in the Korean Intellectual Property Office and Korean Patent Application No. 10-2019-0081288, filed on Jul. 5, 2019, in the Korean Intellectual Property Office, the disclosures of which are herein incorporated by reference in their entireties.

BACKGROUND

1. Field

The disclosure relates to an electronic device for compressing multiple-channel feature map images that are generated during media processing based on a convolutional neural network (CNN), and a method for controlling thereof.

2. Description of Related Art

In a median process of a CNN operation, feature map images in multiple channels are generated. The images have a structure in which a plurality of feature map images are generated for each CNN hierarchy, and the images are converted into a final result at the last hierarchy. When feature map images are stored or read in memory during a process of media processing based on a CNN, a large transmission capacity is necessary for the image data.

In fields such as image recognition, when a multi-layer perceptron (MLP) or a multi-layered neural network is implemented, all inputs into the MLP have importance in the same level, regardless of their locations. Accordingly, if a fully-connected neural network is constructed by using the MLP, there is a problem that the size of the parameter becomes excessively huge. In the conventional technology, such a problem was solved by using a CNN as a solution.

Meanwhile, in the conventional technology, the storage capacity for feature map images could be reduced by applying conventional JPEG, JPEG2000, PNG, or Lempel-Ziv Run-length Coding methods to images of each channel, for compressing images in multiple channels that are generated on each channel during a process of a CNN operation. Also, the storage capacity for feature map images could be reduced by using MPEG-based compression applied to compression of moving images for additional improvement of compression performance based on prediction between image channels, or by using a 3D set partitioning in hierarchical trees (SPIHT) method in which a wavelet compression method for a single image is extensively applied to images in multiple channels for compression of a multi-spectral image of a satellite image.

In case the conventional compression method of images is applied to compression of feature map images, the storage capacity for images can be effectively reduced, but as the method is not an algorithm implemented for the purpose of operation in an embedded system, it is difficult to utilize the method effectively. Accordingly, an effective compression algorithm within the degree of complexity in a level that can be implemented in an embedded system is necessary. Further, as the conventional compression method was developed for effectively compressing general images, the method is not optimized for compression of feature maps.

SUMMARY

The disclosure provides an effective compression method for feature map images to reduce the transmission capacity necessary for storing or reading feature map images generated during CNN processing, and a device for implementing the method.

The provides an effective compression processing structure of feature maps, for example in an embedded system by utilizing information acquired based on the characteristics of feature maps during a CNN learning procedure.

A method of controlling an electronic device according to an embodiment of the disclosure may include providing an image as input into an artificial intelligence model, obtaining a feature map for the image as output from the artificial intelligence model, converting the feature map to a converted feature map using a lookup table corresponding to the feature map, wherein a standard deviation of pixel values of the pixels of the converted feature map is less than a standard deviation of pixel values of the pixels of the feature map, compressing the converted feature map using a compression mode corresponding to the converted feature map among a plurality of compression modes, and storing the compressed feature map in a memory of the electronic device.

Meanwhile, the lookup table corresponding to the feature map may be a lookup table which is generated such that histogram information on a learning feature map corresponding to a type of the feature map is analyzed, and maximum residual among pixel values included in the feature map is decreased.

Also, the lookup table may be a lookup table for converting the feature map to the converted feature map such that a pixel having a pixel value with a high frequency of occurrence among pixel values of the pixels included in the feature map corresponds to a value close to a median value of a variation range of the pixel values of the pixels.

Meanwhile, the step of compressing and storing the feature map may include the steps of analyzing the learning feature map corresponding to the type of the feature map, and identifying the compression mode corresponding to the feature map among a plurality of compression modes, compressing the converted feature map according to the compression mode, and storing information on the compression mode in a header.

Also, the step of compressing the feature map may include the steps of identifying a value of at least one adjacent pixel among a plurality of pixels adjacent to each of the plurality of pixels included in the converted feature map based on the compression mode, predicting the value of each of the plurality of pixels by using the value of the at least one adjacent pixel, and decreasing the value of each of the plurality of pixels by as much as the predicted value.

Further, the method for controlling an electronic device may further include the steps of restoring a residual of the compressed feature map through the compression mode, inverse converting the compressed feature map through the lookup table, and restoring the feature map by inputting the inverse converted feature map into a second layer included in the artificial intelligence model, and the restored feature map may be identical to the converted feature map.

In addition, the method for controlling an electronic device may further include the steps of acquiring a plurality of pixel groups by grouping a plurality of pixels included in the compressed feature map in units of a predetermined number of pixels, identifying a pixel group in which a bit amount is minimized after compression of pixels included in the pixel group as a header group, and determining a number of bits corresponding to a difference of pixel values in the header group, and storing the compressed feature map based on the number of bits.

Also, the predetermined number of pixels may be 4*2 pixel blocks, and in the step of storing the compressed feature map, information on the header group may be stored in the header.

Meanwhile, an electronic device according to an embodiment of the disclosure may include memory, and a processor configured to, based on an image being input into an artificial intelligence model, obtain a feature map for the image as output from the artificial intelligence model, convert the feature map to a converted feature map using a lookup table corresponding to the feature map, wherein a standard deviation of pixel values of the pixels of the converted feature map is less than a standard deviation of pixel values of the pixels of the feature map, compress the converted feature map using a compression mode corresponding to the converted feature map among a plurality of compression modes and store the converted feature map in the memory.

In addition, the processor may analyze the learning feature map corresponding to the type of the feature map, and identify the compression mode corresponding to the feature map among a plurality of compression modes, compress the converted feature map according to the compression mode, and store information on the compression mode in a header.

Also, the processor may identify a value of at least one adjacent pixel among a plurality of pixels adjacent to each of the plurality of pixels included in the converted feature map based on the compression mode, predict the value of each of the plurality of pixels by using the value of the at least one adjacent pixel, and decrease the value of each of the plurality of pixels by as much as the predicted value.

In addition, the processor may restore a residual of the compressed feature map stored in the memory through the compression mode, inverse convert the compressed feature map through the lookup table, and input the inverse converted feature map into a second layer included in the artificial intelligence model to restore the feature map, and the restored feature map may be identical to the converted feature map.

Further, the processor may acquire a plurality of pixel groups by grouping a plurality of pixels included in the compressed feature map in units of a predetermined number of pixels, identify a pixel group in which a bit amount is minimized after compression of pixels included in the pixel group as a header group, determine a number of bits corresponding to a difference of pixel values in the header group, and store the compressed feature map in the memory based on the number of bits.

Also, the predetermined number of pixels may be 4*2 pixel blocks, and the processor may store information on the header group in the memory in a header.

Meanwhile, a method for training an artificial intelligence model by a server according to an embodiment of the disclosure may include the steps of providing a plurality of learning images as input into the artificial intelligence model to be trained, acquiring a plurality of feature maps for the plurality of learning images as outputs from the artificial intelligence model, identifying types of the plurality of feature maps by analyzing histograms of the plurality of feature maps, generating lookup tables corresponding to the types of the plurality of feature maps, and dete identifying compression modes corresponding to the types of the plurality of feature maps among a plurality of compression modes, and transmitting information on the lookup tables and the compression modes to an external device.

Also, the lookup tables corresponding to the types of the feature maps may be lookup tables corresponding to the types of the plurality of feature maps are lookup tables generated such that a maximum residual among pixel values of pluralities of pixels included in the plurality of feature maps is decreased, and the compression modes corresponding to the types of the feature maps may be compression modes identified for compressing the plurality of feature maps such that a bit amount after compression on the plurality of feature maps is minimized among the plurality of compression modes.

In addition, the server according to an embodiment of the disclosure may include a communicator, and a processor configured to, based on a plurality of learning images provided as input to an artificial intelligence model to be trained, acquire a plurality of feature maps for the plurality of learning images as outputs from the artificial intelligence model, identify types of the plurality of feature maps by analyzing histograms of the plurality of feature maps, generate lookup tables corresponding to the types of the plurality of feature maps, identify compression modes corresponding to the types of the plurality of feature maps among a plurality of compression modes, and control the communicator to transmit information on the lookup tables and the compression modes to an external device.

Meanwhile, the lookup tables corresponding to the types of the feature maps may be lookup tables generated such that a maximum residual among pixel values of pluralities of pixels included in the plurality of feature maps is decreased, and the compression modes corresponding to the types of the feature maps may be compression modes identified for compressing the plurality of feature maps such that a bit amount after compression on the plurality of feature maps is minimized among the plurality of compression modes.

Through the disclosure, a large amount of data of feature maps generated during a process of utilizing an embedded system or an application based on an artificial intelligence model in an electronic device can be effectively compressed.

Accordingly, by the disclosure, an artificial intelligence model can be effectively utilized in an electronic device wherein there is limit on the transmission capacity within the device such as a user terminal device, through compressed data and reduced operation time.

BRIEF DESCRIPTION OF THE DRAWINGS

FIG. 8A illustrates a a lookup table according to an embodiment;

FIG. 11 is a sequence diagram illustrating a method of compressing a feature map through a system including a server and an electronic device according to an embodiment of the disclosure;

FIG. 13A is a diagram illustrating the result of compression rates using a specific lookup table and a specific compression mode for a plurality of images according to an embodiment of the disclosure; and FIG. 13B is a diagram illustrating the result of compression rates using a specific lookup table and a specific compression mode for a plurality of images according to an embodiment of the disclosure.

DETAILED DESCRIPTION

Figure 1:
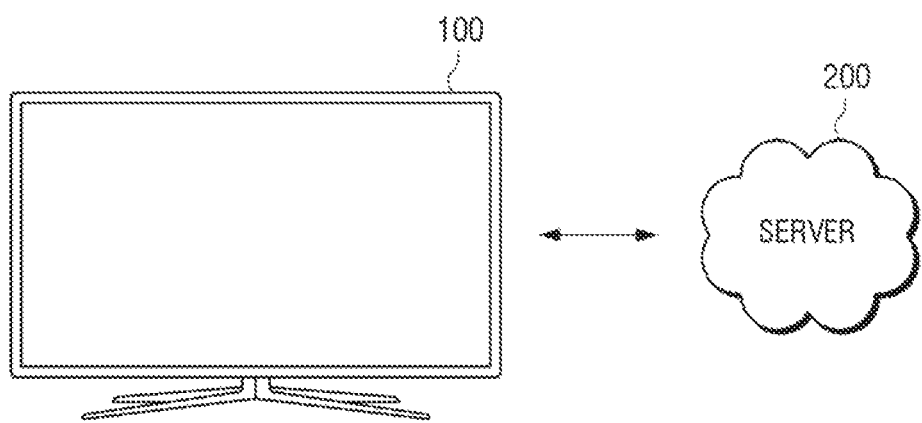
FIG. 1 is a diagram illustrating a system including an electronic device and a server for using an artificial intelligence model according to an embodiment of the disclosure.

Hereinafter, various embodiments of the disclosure will be described with reference to the accompanying drawings. The various embodiments are not for limiting the technology described in the disclosure to a specific embodiment, but they should be interpreted to include various modifications, equivalents and/or alternatives of the embodiments described in the disclosure. Also, with respect to the detailed description of the drawings, similar components may be designated by similar reference numerals.

Further, the expressions "first," "second" and the like used in the disclosure may be used to describe various elements regardless of any order and/or degree of importance. Such expressions are used only to distinguish one element from another element, and are not intended to limit the elements. For example, a first user device and a second user device may refer to user devices that are different from each other, regardless of any order or degree of importance. Accordingly, a first element may be called a second element, and a second element may be called a first element in a similar manner, without departing from the scope of the disclosure.

In addition, the description in the disclosure that one element (e.g., a first element) is "(operatively or communicatively) coupled with/to" or "connected to" another element (e.g., a second element) should be interpreted to include both the case that the one element is directly coupled to the other element, and the case that the one element is coupled to the other element through still another intervening element (e.g., a third element), or additional intervening elements. In contrast, the description that one element (e.g., a first element) is "directly coupled" or "directly connected" to another element (e.g., a second element) should be interpreted such that another element (e.g., a third element) does not exist or intervene between the elements.

Meanwhile, the terms used in the disclosure are selected to explain certain embodiments of the disclosure, and are not intended to limit the scope of the other embodiments. Also, singular expressions may include plural expressions, unless defined obviously differently in the context. The terms used in the disclosure, including technical or scientific terms, may have meanings identical to those generally known to those of ordinary skill in the art described in the disclosure. Terms defined in general dictionaries among the terms used herein may be interpreted to have the same meaning as or a similar meaning to the contextual meaning in the related art. Unless otherwise defined, the terms used herein may not be interpreted to have an ideal or overly formal meaning. In some cases, even terms defined herein may not be interpreted to exclude the embodiments herein.

Hereinafter, various embodiments of the disclosure will be described in detail with reference to the accompanying drawings.

FIG. 1 is a diagram illustrating a system including an electronic device and a server for using an artificial intelligence model according to an embodiment of the disclosure.

Referring to FIG. 1, the server 200 may train an artificial intelligence model based on a convolutional neural network (CNN) by providing a plurality of images as inputs into the model. The server 200 may acquire feature maps for each of the plurality of images during a process of training an artificial intelligence model. Also, the server 200 may analyze features with respect to the acquired plurality of feature maps (e.g., regular patterns according to the types of the feature maps), and may determine lookup tables (LUTs) and compression modes (PMODEs) for efficiently compressing the feature maps based on the features or characteristics of the feature maps. Then, the server 200 may transmit information on LUTs and PMODEs having good compression efficiency according to each of the types of the feature maps for the plurality of images to the electronic device 100.

Here, the LUTs may be tables referenced for converting each of a plurality of pixel values included in a feature map into different values. As an example, in the case of pixel data of 8 bits, the LUTs may include information for converting each of pixel values from 0 to 255 to different values. Here, the LUTs may include information on converted values such that the converted values of each of the pixel values from 0 to 255 corresponds to each of the pixel values from 0 to 255 in an 1:1 relationship, such that the values do not overlap with one another.

As an example, the LUTs may provide an association for converting a pixel value with a high frequency among a plurality of pixels included in a feature map into a median value of a variation range of the pixel values of the plurality of pixels. However, the LUTs are not limited thereto, and they may be implemented in various forms for efficient compression. For example, the LUTS may include information on converted values corresponding to each of the pixel values in an 1:1 relationship, or include information on a specific mathematical formula for converting a pixel value into a different value. A detailed explanation in this regard will be made with reference to FIGS. 7A and 7B.

Meanwhile, the PMODEs may be for analyzing a learning feature map corresponding to the type of a feature map, and compressing the feature map such that the value of each of the pixels on the feature map is minimized among a plurality of compression modes. However, the PMODEs are not limited thereto, and they may be determined in various forms for efficient compression. The electronic device 100 may be an electronic device for driving an artificial intelligence model based on a CNN. The artificial intelligence model based on a CNN in the electronic device 100 may be an artificial intelligence model determined by learning a plurality of images input at the server 200.

As an example, the electronic device 100 may drive a style transfer application that converts an input image into an image in a style similar to a masterpiece painting through a series of image processing. Here, when an image for image recognition is inputted into an artificial intelligence model (an application) based on a CNN in the electronic device 100, the electronic device 100 may obtain a feature map for the input image through a first layer of the artificial intelligence model. Also, here, the electronic device 100 may convert and compress the feature map, and store the feature map in the memory, so that occurrence of a bottle neck phenomenon in the process of storing the feature map in the memory and reading the feature map can be prevented.

Figure 2:
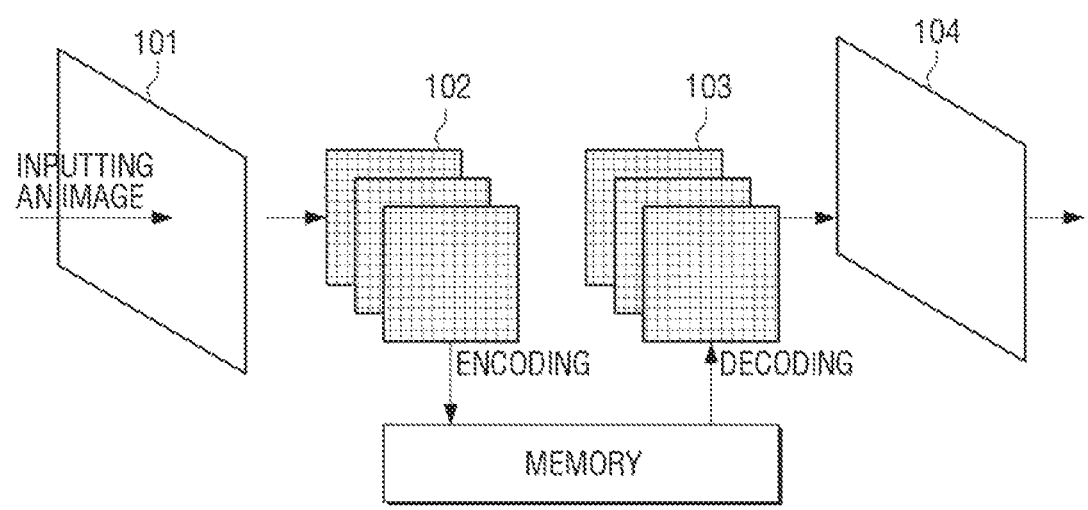
FIG. 2 is a diagram illustrating a process of encoding and decoding of an image input into an artificial intelligence model based on a CNN according to an embodiment of the disclosure.

The electronic device 100 according to an embodiment of the disclosure may receive information on the LUTs and the PMODEs according to each of the types of the feature maps acquired during a process of learning a plurality of images from the server 200, and store the information in the memory. Also, the electronic device 100 may determine the type of the feature map for an input image, and convert and compress the feature map for the input image based on the information of the LUTs and the PMODEs stored in the memory, as illustrated in FIG. 2. The electronic device 100 may store information of the LUTs and the PMODEs for each type of feature maps that the device acquired by self-learning in the memory.

FIG. 1 illustrates an example of the electronic device 100 implemented as a television. However, the electronic device 100 is not limited thereto, and the electronic device 100 may be implemented as various types of electronic devices including a server 200 and a communication means that is capable of transmitting and receiving data with an external device. For example, the electronic device 100 may be implemented as an electronic device including a display such as a smartphone and a smart TV, or in the form of a chip that is included in another electronic device and performs functions.

FIG. 2 is a diagram illustrating a process of encoding and decoding of an image input into an artificial intelligence model based on a CNN according to an embodiment of the disclosure.

Referring to FIG. 2, when an image is input into an application based on a CNN in the electronic device 100, the electronic device 100 may obatain a feature map 102 for the input image through a first layer 101 included in the CNN. Here, the first layer 101 may be a convolution layer that generates a feature map for an input image by using a weight or a convolution filter set based on the result of learning through a plurality of images.

According to an embodiment of the disclosure, in case an artificial intelligence model is a CNN consisting of 10 hierarchies and 128 feature maps are generated for one hierarchy, the electronic device 100 needs to store or read 1280 (10 hierarchies*128 channels) feature maps for one input image. As described above, in case an artificial intelligence model in the electronic device 100 is constructed as an embedded system, it is necessary to reduce the transmission capacity and the storage capacity by compressing feature maps.

In order to store a plurality of feature maps by compression, the electronic device 100 may convert and compress (encode) the generated feature maps through the LUTs and the PMODEs transmitted from the server 200. Referring to FIG. 2, the electronic device 100 may store the feature maps having reduced data size through encoding in the memory, and may decode the feature maps stored in the memory, if necessary. Here, the memory may be memory included in the electronic device 100, or memory included in an external device or an external server.

Meanwhile, the electronic device 100 may decode the stored feature maps, which were stored while being compressed through the LUTs and the PMODEs used during encoding, and accordingly, the electronic device 100 may restore the feature maps 103 before encoding. Further, the electronic device 100 may input the feature maps 103 into a second layer 104 included in an artificial intelligence model, and perform a process based on a CNN. The second layer 104 may be a pooling layer for subsampling feature maps, or a ReLU layer, or another convolution layer, but the second layer 104 is not limited thereto. The feature map 102 acquired by inputting the input image into the first layer 101 and the feature map 103 acquired by decoding the encoded feature map stored in the memory may be identical. According to an embodiment of the disclosure, the electronic device 100 may perform lossless compression as a feature map is encoded and decoded based on LUTs and PMODEs.

According to the aforementioned embodiment, the electronic device 100 may perform operations with relatively small capacity in an application based on a CNN or an embedded system based on artificial intelligence, even if a large number of feature maps are generated.

Figure 3:
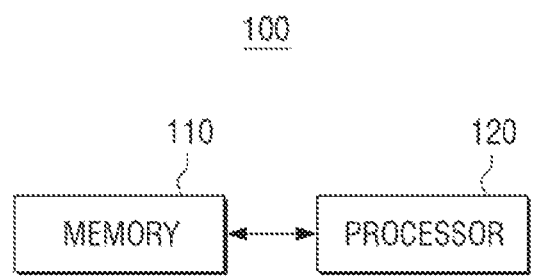
FIG. 3 is a block diagram illustrating a configuration of an electronic device according to an embodiment of the disclosure.

FIG. 3 is a block diagram illustrating a configuration of an electronic device according to an embodiment of the disclosure. Referring to FIG. 3, the electronic device 100 may include memory 110 and a processor 120.

The memory 110 may store an application based on a CNN or an embedded system based on artificial intelligence in the electronic device 100. Also, the memory 110 may store various types of information such as information on feature maps generated while performing an operation through a CNN, information on a plurality of compression modes for compressing feature maps, information on an image previously inputted, etc. In addition, the memory 110 may store information on LUTs and PMODEs corresponding to each of the types of the feature maps received from an external server 200. Meanwhile, this is merely an example, and the electronic device 100 may store information on the LUTs and the PMODEs corresponding to each of various types of feature maps that the device acquired by learning based on a plurality of sample images in the memory 110.

Further, the memory 110 may store various types of data for the overall operations of the electronic device 100 such as a program for processing or control of the processor 120, etc. Also, the memory 110 may store data and instructions for the operations of a plurality of application programs (application programs or applications) driven at the electronic device 100, and the operations of the electronic device 100. At least some of such application programs may be downloaded from an external server through wireless communication. Also, at least some of such application programs may exist in the electronic device 100 from the time the product was released by a manufacturer, for the basic functions of the electronic device 100. Further, such application programs may be stored in the memory 110, and may be executed to perform the operations (or functions) of the electronic device 100 under control by the processor 120.

The memory 110 may be implemented as nonvolatile memory, volatile memory, flash memory, a hard disk drive (HDD), or a solid state drive (SSD), etc. The memory 110 may be accessed by the processor 120, and reading/recording/correction/deletion/update, etc. of data by the processor 120 may be performed. In the disclosure, the term memory may include the memory 110, ROM and RAM inside the processor 120, or a memory card mounted on the electronic device 100 (e.g., a micro SD card, a memory stick, USB memory, etc.).

The processor 120 controls the overall operations of the electronic device 100by by executing various types of programs stored in the memory 110.

When an input image is inputted into an artificial intelligence model, the processor 120 may acquire a feature map for the image by a first layer included in the artificial intelligence model, and convert the feature map through a lookup table corresponding to the feature map.

Also, the processor 120 according to an embodiment of the disclosure may compress the converted feature map through a compression mode corresponding to the feature map among a plurality of compression modes and store the feature map in the memory 110. For example, the processor 120 may perform compression of the converted feature map through a lookup table based on information on a compression mode corresponding to the feature map received from the server 200. As another example, the processor 120 may perform compression on the converted feature map based on each of the plurality of compression modes, and compress the converted feature map based on a compression mode having a best compression rate and store the feature map in the memory 110. As still another example, information on a compression mode corresponding to the feature map received from the server 200 may indicate that the first compression mode and the second compression mode among the plurality of compression modes correspond to the feature map. The processor 120 may identify a compression mode having a relatively high compression rate between the first compression mode and the second compression mode, and compress the converted feature map based on the identified compression mode.

The processor 120 according to an embodiment of the disclosure may predict the value of the pixel based on the value of at least one pixel among pixels adjacent to the pixel among each of a plurality of pixels included in a feature map converted for compressing the converted feature map according to a compression mode, and replace the value of the pixel with a residual excluding the predicted value. Here, a smaller residual may mean a higher compression rate.

Also, the processor 120 according to an embodiment of the disclosure may restore the value of the pixel by adding the predicted value to the residual based on the compression mode for decoding the compressed feature map stored in the memory 110, and release compression by inverse converting the converted feature map through an inverse lookup table. In addition, the processor 120 may input the restored feature map into a second layer included in the artificial intelligence model. This process will be described in detail below.

Further, the processor 120 according to an embodiment of the disclosure may store information on the compression mode used for compressing the feature map in the header. For example, the processor 120 may acquire a plurality of pixel groups by grouping the plurality of pixels included in the compressed feature map in units of a predetermined number of pixels, identify a pixel group in which the bit amount is the minimum after compression within the group among the plurality of pixel groups as a header group, determine the number of bits corresponding to the difference of the pixel values in the header group, and store the compressed feature map in the memory 110 based on the number of bits. This process will also be described in detail below.

Figure 4:
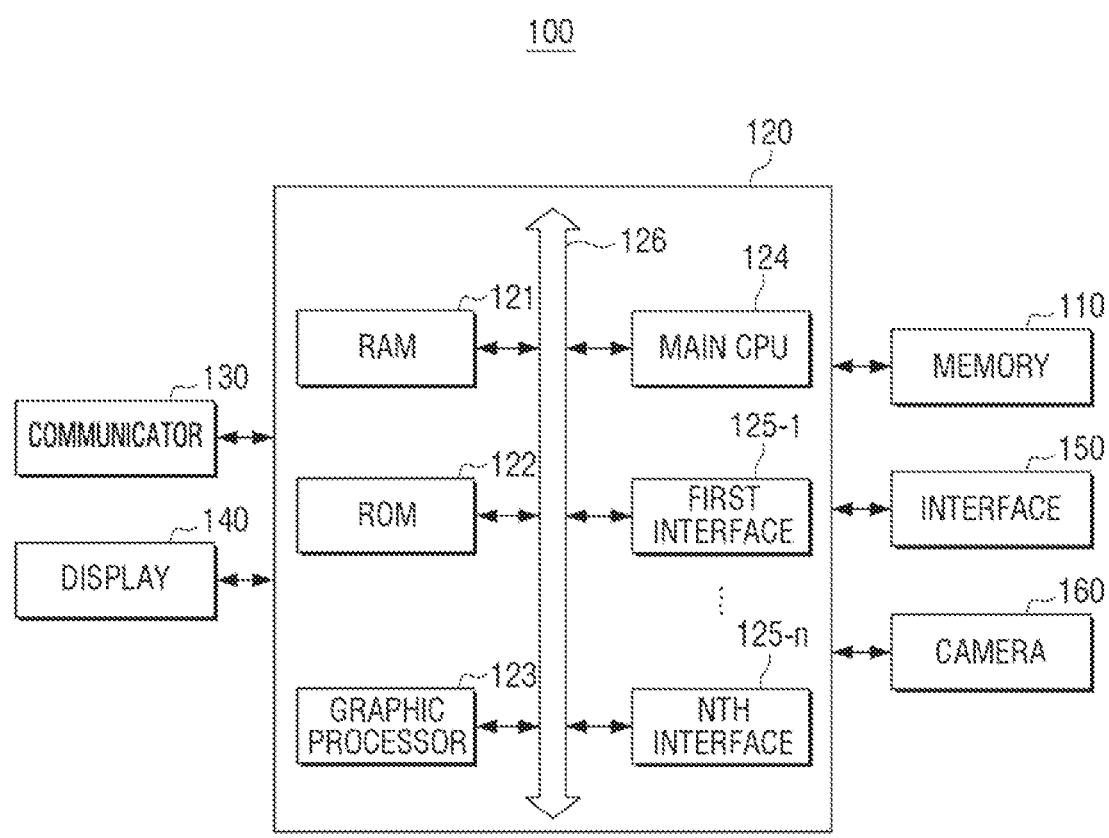
FIG. 4 is a block diagram illustrating a configuration of an electronic device according to an embodiment of the disclosure.

FIG. 4 is a block diagram illustrating a configuration of an electronic device according to an embodiment of the disclosure.

Referring to FIG. 4, the electronic device 100 may include memory 110, a processor 120, a communicator 130, a display 140, an interface 150, and a camera 160. However, the disclosure is not limited thereto, and the electronic device 100 may include various components. With respect to the memory 110 and the processor 120, redundant explanations will be omitted.

The processor 120 includes RAM 121, ROM 122, a graphic processor 123, a main CPU 124, and first to $n^{th}$ interfaces 125-1~125-n. Here, the RAM 121, ROM 122, graphic processor 123 (graphics processing unit, GPU), main CPU 124, first to $n^{th}$ interfaces 125-1~125-n, etc. may be connected with one another through at least one bus 126.

The ROM 122 stores a set of instructions, etc. for system booting. When a power is supplied to the electronic device 100, the main CPU 124 copies the operating system (O/S) stored in the memory 110 in the RAM 121 according to the instruction stored in the ROM 122, and boots the system by executing the O/S. When booting is completed, the main CPU 124 copies the various types of application programs stored in the memory 110 in the RAM 121, and performs various types of operations by executing the application programs copied in the RAM 121.

According to an embodiment of the disclosure, the processor 120 may be implemented as a digital signal processor (DSP) processing digital signals, and a microprocessor. However, the disclosure is not limited thereto, and the processor 120 may include one or more of a central processing unit (CPU), a micro controller unit (MCU), a micro processing unit (MPU), a controller, an application processor (AP) or a communication processor (CP), and an ARM processor. Also, the processor 120 may be implemented as a system on chip (SoC) having a processing algorithm stored therein or large scale integration (LSI), or in the form of a field programmable gate array (FPGA).

The communicator 130 is a communication interface for communicating with an external server 200. The communicator 130 may receive information on LUTs and PMODEs which have good compression efficiency according to each of the types of feature maps for a plurality of images from the external server 200. However, this is merely an example, and the communicator 130 may receive various types of information from the external server 200, and may communicate with various types of external devices other than the external server 200.

Meanwhile, the communicator 130 may include a communication module for at least one communication method among wireless fidelity (WiFi), Bluetooth (BT), near field communication (NFC), global positioning system (GPS), and Ethernet or cellular communication through a carrier sense multiple access/collision detection (CSMA/CD) method (e.g., 4G (generation), LTE, LTE-A, 5G, CDMA, WCDMA, UMTS, Wibro, or GSM, etc.). Also, the communicator 130 may be implemented as a plurality of communication parts that correspond to at least one communication module as described above.

In particular, each of a WiFi chip and a Bluetooth chip may perform communication by a WiFi method and a Bluetooth method, respectively. In the case of using a WiFi chip or a Bluetooth chip, various types of connection information such as a SSID or a session key may be transmitted and received in advance, and communication is established by using the information, and then various types of information can be transmitted and received. A wireless communication chip means a chip that performs communication according to various communication standards such as IEEE, Zigbee, 3rd Generation (3G), 3rd Generation Partnership Project (3GPP), Long Term Evolution (LTE), etc. Meanwhile, an NFC chip means a chip that operates in a near field communication (NFC) method using a 13.56 MHz band among various RF-ID frequency bands such as 135 kHz, 13.56 MHz, 433 MHz, 860~960 MHz, and 2.45 GHz.

The display 140 may display various screens generated at the graphic processor 123, for performing functions according to control of the processor 120. The display 140 may display an image to be inputted into an artificial intelligence model included in the electronic device 100, and the display 140 may also display a result of adding various effects to an image through an artificial intelligence model. For example, the display 140 may display an image with respect to the result of performing style transfer on an input image.

The display 140 may be implemented as a liquid crystal display panel (LCD), organic light emitting diodes (OLEDs), etc., but the display 140 is not limited thereto. In addition, depending on design and implementation of the electronic device 100, the display 140 may be implemented as a flexible display, a transparent display, etc.

Further, the display 140 according to an embodiment of the disclosure may include not only a display panel that outputs images, but also a bezel that houses the display panel. In particular, a bezel according to an embodiment of the disclosure may include a touch detector for detecting a user interaction.

The display 140 may have various sizes. For example, the display 140 may have sizes such as 3 inches, 4 inches, 4.65 inches, 5 inches, 6.5 inches, 8.4 inches, 32 inches, 45 inches, etc., as generally measured for indicating a viewable area of the display 140. Also, the display 140 may consist of a plurality of pixels. Here, the number of the plurality of pixels in the width X the length may be expressed as a resolution of the display 140.

Also, the display 140 may be implemented as display panels in various forms. For example, the display panel may be implemented as various types of display technologies, such as a liquid crystal display (LCD), organic light emitting diodes (OLEDs), an active-matrix organic light-emitting diode (AM-OLED), liquid crystal on silicon (LcoS), or digital light processing (DLP), etc. In addition, the display 140 may be coupled to at least one of the front surface area, the side surface area, or the rear surface area of the electronic device 100, in the form of a flexible display.

The display 140 may be coupled to a touch detector, and may be implemented as a touch screen in a layered structure. A touch screen may have a display function, and may also have a function of detecting the pressure or change in capacitance of a touch input as well as the location of a touch input and the touched area. Also, the display 140 may have a function of detecting a proximity touch as well as a real touch.

The interface 150 is a component for connecting an external device to the electronic device 100, for inputting and outputting video and audio. For example, the interface 150 may include at least one of a universal serial bus (USB), a high definition multimedia interface (HDMI), recommended standard 232 (RS-232), a plain old telephone service (POTS) DVI, a display port (DP), or a thunderbolt, which are components for wired communication. A HDMI is an interface capable of transmitting high performance data for an AV device outputting audio and video. A DP is an interface capable of realizing a screen with an ultra high resolution such as 2560×1600 or 3840×2160 as well as a screen in a full HD level of 1920×1080, and a 3D stereoscopic image, and which is also capable of transmitting digital sound. A thunderbolt is an input and output interface for transmitting and connecting data at a high speed, and is capable of connecting a PC, a display, a storage device, etc. in parallel with one port.

However, the aforementioned input and output terminals are merely examples, and the interface 150 may also include a port for outputting only audio signals, or a port for outputting only video signals, in addition to the aforementioned terminals.

The camera 160 is an imaging device for photographing images according to control of a user. In particular, the camera 160 may photograph various types of images for photographing images to be inputted into an application based on a CNN or an embedded system based on artificial intelligence included in the electronic device 100.

Figure 5:
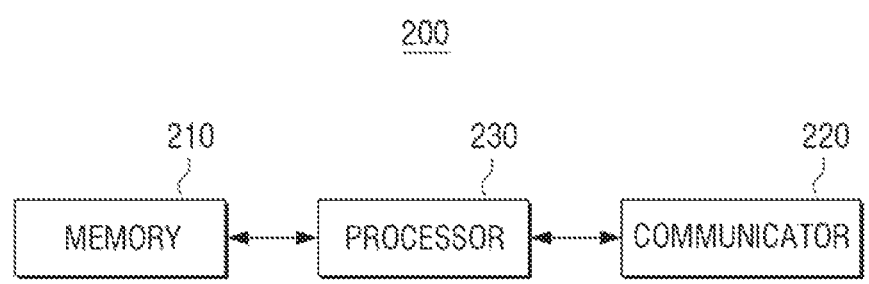
FIG. 5 is a block diagram illustrating a configuration of a server according to an embodiment of the disclosure.

FIG. 5 is a block diagram illustrating a configuration of a server according to an embodiment of the disclosure. Referring to FIG. 5, the server 200 may include memory 210, a communicator 220, and a processor 230.

The memory 210 may store an artificial intelligence model (e.g., a CNN, etc.) to be trained. Also, the memory 210 may store various types of information, such as information on a feature map that is generated while an operation through a CNN is performed, information on a plurality of compression modes for compressing a feature map, information on an image that was previously inputted, etc. In addition, the memory 210 may store information on LUTs and PMODEs corresponding to each of the types of learning feature maps corresponding to learning images.

Further, the memory 210 may store various types of data for the overall operations of the server 200 such as a program for processing or control by the processor 230, etc. Also, the memory 210 may be implemented as nonvolatile memory, volatile memory, flash memory, a hard disk drive (HDD), or a solid state drive (SSD), etc.

The communicator 220 is a communication interface for communicating with the electronic device 100. The communicator 220 may transmit information on LUTs and PMODEs that have good compression efficiency according to each of the types of feature maps for a plurality of images to the electronic device 100. However, this is merely an example, and the communicator 220 may transmit various types of information to the electronic device 100, and may communicate with various types of external devices other than the electronic device 100.

Meanwhile, the communicator 220 may include a communication module for at least one communication method among wireless fidelity (WiFi), Bluetooth (BT), near field communication (NFC), global positioning system (GPS), and Ethernet or cellular communication through a carrier sense multiple access/collision detection (CSMA/CD) method (e.g., LTE, LTE-A, CDMA, WCDMA, UMTS, Wibro, or GSM, etc.). Also, the communicator 220 may be implemented as a plurality of communication components that correspond to at least one communication module as described above.

The processor 230 controls the overall operations of the sever 200 by executing various types of programs stored in the memory 210.

The processor 230 may generate a lookup table for converting a feature map to effectively compress a feature map acquired as a plurality of learning images were input in an artificial intelligence model. Also, the processor 230 may determine a compression mode for efficiently compressing each of the types of the converted feature maps among a plurality of compression modes.

To be specific, the processor 230 may analyze histogram information of a learning feature map, and identify the number of frequencies of pixel values according to a plurality of pixels included in the feature map. For example, in the case of pixel data of 8 bits, the processor 230 may identify the number of frequencies of each of pixel values from 0 to 255 according to the plurality of pixels included in the feature map.

The processor 230 according to an embodiment of the disclosure may generate a lookup table for converting a pixel value having the highest frequency into a specific value among 0 to 255. For example, if the pixel value having the highest frequency is 0, the pixel value 0 may be converted into 127. Then, the processor 230 may generate a lookup table for converting the remaining pixel values into other values. A lookup table according to an embodiment of the disclosure may include information on converted values corresponding to each of pixel values from 0 to 255 in an 1:1 relationship. For example, a lookup table may include information on an 1:1 corresponding relationship, such that a pixel value 0 is converted into 127, a pixel value 1 is converted into 126, and a pixel value 255 is converted into 128. Meanwhile, this is merely an example, and a lookup table is not limited thereto. For example, a lookup table may include information on a specific mathematical formula for converting a pixel value into another value, and the processor 230 may calculate a converted value corresponding to a pixel value based on a mathematical formula, and convert a feature map based on the acquired converted value.

Also, the processor 230 according to an embodiment of the disclosure may generate a lookup table for converting the maximum residual between pixel values to a lower value. For example, the processor 230 may generate a lookup table for performing conversion such that a pixel having a pixel value with the highest frequency among a plurality of pixels included in a feature map corresponds to a median value of a variation range of the pixel values of the plurality of pixels (e.g., 0 to 255). Further, the processor 230 may generate a lookup table for performing conversion such that a pixel having a pixel value with the second highest frequency corresponds to a value adjacent to or close to the median value. For example, if the pixel value having the highest frequency is 0, the processor 230 may convert the pixel value 0 into 127 among 0 to 255 in the variation range of pixel values, and if the pixel value having the second highest frequency is 255, the processor 230 may convert the pixel value 255 into 126 or 128 among 0 to 255 in the variation range of pixel values. Also, a lookup table may include information on an 1:1 corresponding relationship such that the remaining pixel values have values that trend away from the median value (e.g., 127) based on the number of frequencies. Detailed explanation in this regard will be made with reference to FIGS. 7A and 7B.

In addition, the processor 230 may analyze a learning feature map corresponding to the type of a feature map, and determine a compression mode for compressing the feature map such that the bit amount of the feature map after compression becomes a minimum value among a plurality of compression modes.

Meanwhile, the processor 230 includes RAM, ROM, a graphic processor, a main CPU, and first to $n^{th}$ interfaces. Here, the RAM, ROM, graphic processor, main CPU, first to $n^{th}$ interfaces, etc. may be connected with one another through at least one bus. Meanwhile, for the convenience of explanation, a lookup table corresponding to a feature map is acquired based on a plurality of learning images, and a series of operations for identifying a compression mode is performed at the server 200. However, this is merely an example, and the operations may be performed at the electronic device 100. As another example, an operation of acquiring a lookup table corresponding to a feature map based on a plurality of learning images is performed at the sever 200, and operations for identifying a compression mode having the highest compression rate for the feature map among a plurality of compression modes can be performed at the electronic device 100.

Figure 6:
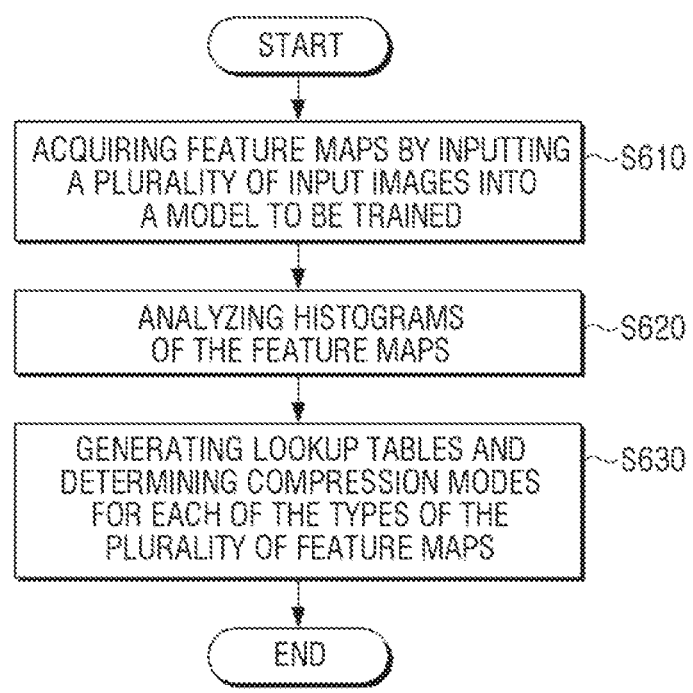
FIG. 6 is a flowchart illustrating a method of generating a lookup table and determining a compression mode in a process of training an artificial intelligence model according to an embodiment of the disclosure.

FIGS. 6 to 8 describe generating a lookup table and determining a compression mode in a process of training an artificial intelligence model according to an embodiment of the disclosure.

Referring to FIG. 6, the server 200 may input a plurality of images into an artificial intelligence model for training the artificial intelligence model (e.g., a CNN). Here, in the artificial intelligence model, the weight for each node or the value of the convolution filter be adjusted such that feature maps for a plurality of images form a specific pattern. Meanwhile, based on the filter or weight set through such a training process, the artificial intelligence model may acquire feature maps for each of the plurality of inputted images at operation S610.

The server 200 may analyze histograms of the feature maps for the plurality of images at operation S620. Here, the histograms may include information on distribution of the pixel values of each of the plurality of pixels included in the feature maps. Also, the server 200 may determine the types of the feature maps based on the distribution of the plurality of pixel values. That is, the server 200 may determine the types of the feature maps by acquiring a database for the distribution of the pixel values for the plurality of feature maps, determine the distribution of each of the plurality of feature maps, and compare the distribution of the pixel values of each of the plurality of feature maps with the database.

For example, in case pixel values included in feature maps are expressed with '8 bit grayscale,' each of the pixel values may be represented by a value between 0~255. The server 200 may determine distribution of the pixel values in consideration of various factors such as the ratio of pixels having a pixel value between 0~50, the ratio of pixels having a pixel value between 200~255 among the pixels included in the feature maps, and define feature maps having specific ratios as a first type, a second type, etc. As an example, the server 200 may define a feature map in which the ratio of pixels having a pixel value between 0~30 is 30%, and the ratio of pixels having a pixel value between 225~255 is 40% as 'a first type.' Thus, in case it is determined that distribution of pixel values of a feature map is similar to the distribution of pixel values of a previous 'first type,' the server 200 may identify the feature map as a first type. However, the aforementioned embodiment is merely an example, and the server 200 may identify various types in consideration of various factors.

In addition, the server 200 may generate a lookup table for effectively compressing a plurality of feature maps according to each of the types of the plurality of feature maps, and determine a compression mode at operation S630. To be specific, a lookup table is a lookup table for converting each of the pixel values of a feature map for effectively compressing the feature map. Such a lookup table may be constituted to convert each pixel in a one-to-one correspondence with a plurality of pixels.

FIGS. 7 and 8 are diagrams for illustrating a lookup table and a compression mode for converting a feature map.

Figure 7A:
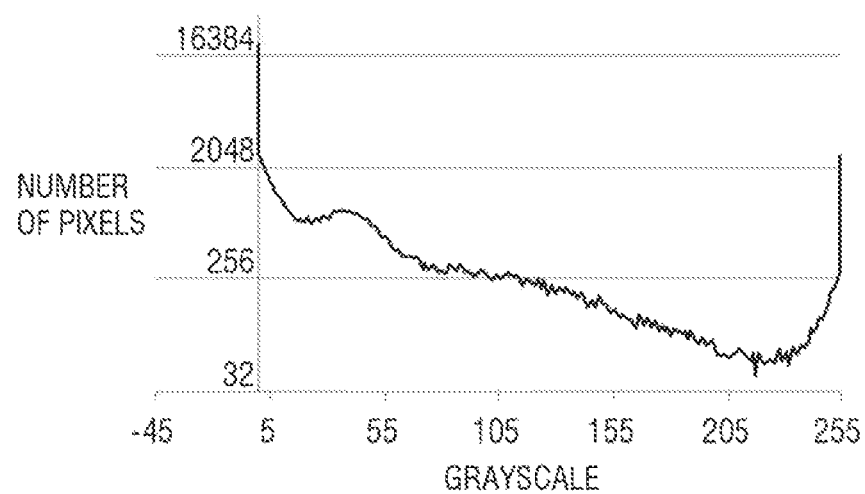
FIG. 7A is a graph illustrating a histogram before a feature map is converted through a lookup table according to an embodiment of the disclosure.
Figure 7B:
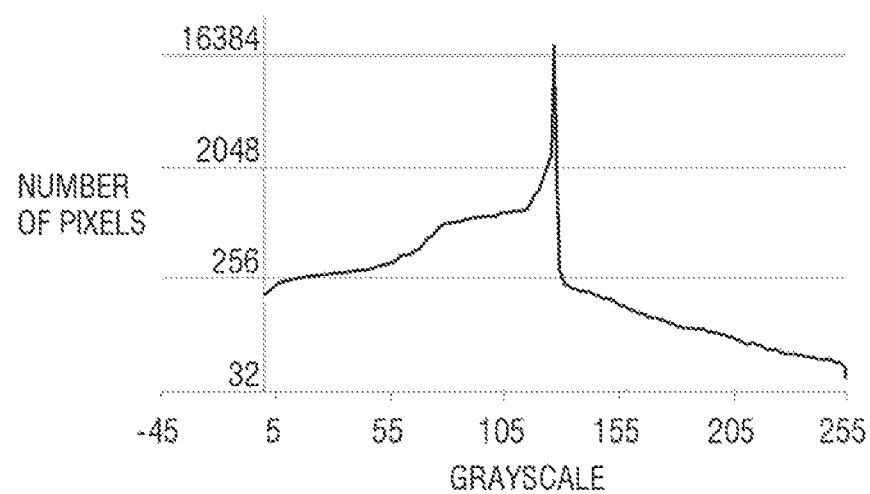
FIG. 7B is a graph illustrating a histogram after a feature map is converted through a lookup table according to an embodiment of the disclosure.

To be specific, FIG. 7A illustrates a histogram before a feature map is converted through a lookup table and FIG. 7B illustrates the histogram after conversion according to an embodiment of the disclosure. Referring to FIG. 7A, a feature map before conversion through a lookup table has a histogram in which the ratios of pixels having a pixel value between 0~30 and pixels having a pixel value between 225~255, from among pixels of all values 0~225, is high. In other words, a number of the pixels having values between 0~30 and a number of the pixels having values between 225~255 is relatively high as compared to pixels having values outside of the ranges of 0~30 and 225~255. The server 200 may identify a feature map having such distribution of pixel values as a specific type (e.g., 'a first type'). A distribution of pixel values may be a characteristic of the feature map by which the feature map is identified against other types of feature maps having different pixel value distribution characteristics.

Meanwhile, in case the server 200 converts a feature map through 'a first lookup table' corresponding to the histogram illustrated in FIG. 7A, pixels having a pixel value between 0~30 of the feature map may be converted to have a pixel value between 120~150, and pixels having a pixel value between 225~255 may be converted to have a pixel value between 150~180. That is, the distribution of the pixel values of the feature map may be converted from distribution in which pixel values are spread to both sides of the histogram (FIG. 7A) to distribution in which pixel values are concentrated in the center of the histogram (FIG. 7B).

Meanwhile, according to an embodiment of the disclosure, explanation was made based on the assumption that the server 200 identifies a plurality of types for a feature map based on a plurality of learning images, and acquires lookup tables for each type of the feature map. However, the disclosure is not limited thereto.

According to an embodiment of the disclosure, the server 200 may acquire a lookup table by a method of converting the pixel value having the highest frequency into a median value in the range of pixel values (e.g., 0 to 255), and converting the pixel value corresponding to the second highest frequency into a value adjacent to a median value based on the histogram of the feature map. Also, the server 200 may acquire a lookup table by a method of designating the median value to the pixel value having the highest frequency, designating a value adjacent to and greater than the median value to the pixel value having the second highest frequency, and designating a value adjacent to and less than the median value to the pixel value having the third highest frequency based on the histogram.

As another example, a feature map to which an activation function is applied may include a plurality of pixels having pixel values from 0 to 255. Accordingly, the sever 200 may convert a feature map based on mathematical formulae, as shown below. As an example, for pixel values from 0 to 127, conversion of a feature map may be performed based on the mathematical formula 1, and for pixel values from 128 to 255, conversion of a feature map may be performed based on the mathematical formula 2. In the converted feature map, pixel values of 0 and 255 may be converted to 127 and 128, respectively, and the standard deviation may decrease as illustrated in FIG. 7B.

$$pv1=pv+(127-2*pv) \quad \text{[Mathematical Formula 1]}$$

$$pv1=pv+383-2*pv \quad \text{[Mathematical Formula 2]}$$

Here, pv1 means a converted pixel value, and pv means a pixel value. Meanwhile, as described above, an operation of acquiring a lookup table may be performed by the electronic device 100, but not the server 200.

In case the standard deviation of the distribution of pixel values on a histogram decreases (i.e., in case pixel values are concentrated in the center of a graph), as in FIG. 7B, the differences (or residuals) between the values of each pixel and the predicted values of each pixel decrease on the whole. Referring to FIG. 7A, the number of frequencies of the pixel value 0 and the pixel value 255 is relatively high compared to the remaining pixel values. If the predicted value is the median value (e.g., 127), the proportion that 127 (the difference between the pixel value 0 and the median value 127) or 128 (the difference between the pixel value 255 and the median value 127) occupies in the difference between a pixel value and the predicted value (or, a residual) is high, and accordingly, the compression rate decreases. This is because the effectiveness of encoding large values, such as the large residual values, may be poor. In contrast, in the case of a feature map converted through a lookup table, if the predicted value is the median value (e.g., 127), the proportion that 127 or 128 occupies in the difference between a pixel value and the predicted value (or, a residual) is low, and the proportion that 0 (the difference between 127 which is the converted value of the pixel value 0 and the median value 127) or 1 (the difference between 128 which is the converted value of the pixel value 255 and the median value 127) occupies is high. Accordingly, the compression rate becomes higher. This is because the effectiveness of encoding small values, such as the small residual values, and in particular values of 0 and 1, may be high.

According to an embodiment of the disclosure, the electronic device 100 may perform compression according to a compression mode on a feature map converted to indicate the form of a graph having a small standard deviation based on a lookup table. In the case of using a feature map converted such that the standard deviation decreases as above, there is an effect that the electronic device 100 can store the feature map with low storage capacity. That is, a size of the encoded feature map is reduced. Detailed explanation in this regard will be made with reference to FIG. 8.

Figure 8B:
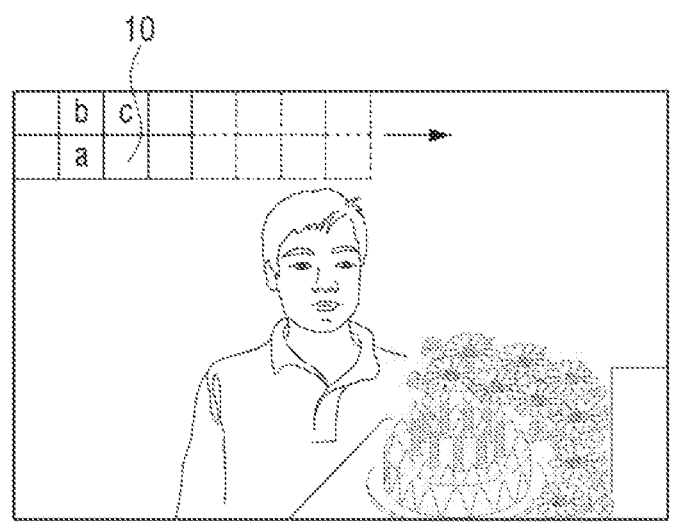
FIG. 8B illustrates a diagram of determining a compression mode in a process of training an artificial intelligence model according to an embodiment of the disclosure.

FIGS. 8A and 8B are diagrams for illustrating a compression mode for compressing feature maps according to an embodiment of the disclosure.

The server 200 may predict the values of each pixel. The server 200 may predict pixel values through a plurality of compression modes (or PMODEs). Here, a compression mode may mean a relation between the pixel and an adjacent pixel. Referring to FIG. 8A, a PMODE 0 may calculate a predicted value Pred_x of a pixel x to be predicted by using three pixels a, b, c near pixel x. Likewise, a PMODE 1 may use a pixel a) near a pixel x to be predicted. Meanwhile, a PMODE 2 may use a pixel b near a pixel x to be predicted, a PMODE 3 may use the average value of the adjacent pixels a, b of the pixel x to be predicted, and a PMODE 4 may use a pixel c near the pixel x to be predicted. In this case, the nearby pixels a, b, c may be three pixels that are arranged in a clockwise order of pixels in an image from the pixel on the left side of the pixel x to be predicted. Detailed explanation in this regard will be made with reference to FIG. 8B.

Referring to FIG. 8B, the server 200 may acquire a predicted value using at least one pixel among a pixel 'a' located adjacent to the left side of the subject pixel 10, a pixel 'b' located in an upper-left diagonal direction adjacent to the subject pixel 10, and a pixel 'c' located adjacent to the upper side of the subject pixel 10. As an example, the compression mode PMODE 1 may be a compression mode acquiring a predicted value (Pred_x=a) based on the pixel a located adjacent to the left side of the subject pixel. In this case, the electronic device 100 may acquire a residual after subtracting a value of the pixel 'a' from the pixel value of the subject pixel 10, and replace the pixel value of the subject pixel 10 with the acquired residual value. Here, if the value of the pixel 'a' is greater than the value of the subject pixel 10, then the residual value may be 0 and the value of the subject pixel 10 may be replaced with the value of 0.

Meanwhile, for the convenience of explanation, an embodiment in which the electronic device 100 acquires a predicted value with a combination based on at least one pixel among three pixels adjacent to the subject pixel 10 according to a compression mode was described based on the assumption that compression is performed on a feature map using a scan order from the left side to the right side in units of pixel blocks in a predetermined size. However, the disclosure is not limited thereto. For example, the electronic device 100 may acquire a predicted value with a combination based on at least one pixel among five pixels adjacent to the subject pixel 10 according to a compression mode.

Meanwhile, the compression mode PMODE and the pixels a, b, c illustrated in FIG. 8A are merely examples, and compression may be performed through various compression modes. For example, a PMODE 5 may use the average value of the adjacent pixels a, b, c of the pixel x to be predicted. The server 200 may decrease each of the pixel values as much as the predicted value (Pred_x) predicted through a compression mode. For example, in case a specific pixel has a 8 bit grayscale value of 150, and the predicted value of the pixel which was predicted through a specific compression mode is 145, the server 200 may decrease the pixel value as much as the predicted value. In this case, the pixel value 150 may be replaced with the value 5. Therefore, whereas storage capacity of 8 bits was required for a value of 150, the pixel value of the pixel value 5 may be stored only with storage capacity of 4 bits.

Meanwhile, the server 200 may evaluate compression through each of a plurality of compression modes (e.g., 5 compression modes as in FIG. 8), for compressing a feature map. In case it is determined that the PMODE 1 has the best compression efficiency on the whole, as a result of compression, the server 200 may determine that the compression mode corresponding to the feature map is the PMODE 1, and further, determine that the compression mode corresponding to the type to which the feature map belongs is the PMODE 1. As an example, the server 200 may indicate the pixel value of each of the plurality of pixels as a residual excluding the predicted value with the PMODE 1, and identify whether the residual can be stored with storage capacity of 4 bits. For example, if a residual excluding the predicted value in the pixel value is 0 to 15, the pixel value can be stored with storage capacity of 4 bits, and thus the compression rate can become higher.

Also, the server 200 may evaluate compression through each of a plurality of compression modes with respect to a feature map converted through a lookup table determined as described in FIG. 7A-B. Likewise, the server 200 may determine a compression mode showing the best compression efficiency with respect to the converted feature map to correspond to the lookup table.

That is, the server 200 may determine a lookup table and a compression mode by which a feature map for an input image is compressed at the maximum. Also, the server 200 may determine and store the determined lookup table and compression mode to correspond to the type to which the feature map belongs. For example, in case the feature map of the inputted first image belongs to 'a first type,' and conversion and compression through 'a first lookup table' and 'a PMODE 1' showed the maximum compression efficiency, the server 200 may store 'the first type,' 'the first lookup table,' and 'the PMODE 1' of the feature map to correspond to one another. Here, in case a second image is input later, if it is determined that the feature map of the second image is classified as the first type, the server 200 may compress the second image through 'the first lookup table' and 'the PMODE 1.'

Meanwhile, the server 200 may store compression modes such that at least two compression modes for each type of a feature map correspond to each other. As an example, if a feature map is the first type, the server 200 may store compression modes such that the PMODE 1 and the PMODE 2 correspond to each other. Also, according to an embodiment of the disclosure, the electronic device 100 may convert a feature map based on a first lookup table corresponding to the feature map, and perform compression based on the PMODE 1 and the PMODE 2. Then, the electronic device 100 may identify a compression mode having a relatively high compression rate between the PMODE 1 and the PMODE 2, and perform compression for the converted feature map based on the identified compression mode. Meanwhile, this is merely an example, and the electronic device 100 may identify a compression mode having the highest compression rate based on the compression rate of each of any number of a plurality of compression modes (e.g., the PMODE 0 to the PMODE 4).

In the aforementioned embodiment, only the case of compressing an image at the server 200 was described, but the electronic device 100 may compress an image through a lookup table and a compression mode acquired at the server 200. This will be described in detail with reference to FIGS. 9 and 10.

Figure 9:
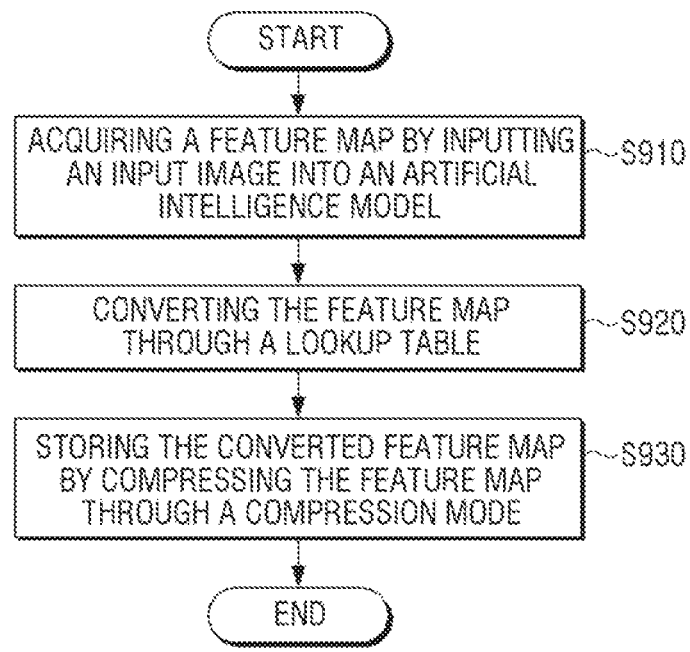
FIG. 9 is a flowchart illustrating a method of converting and compressing an input image by using a lookup table and a compression mode according to an embodiment of the disclosure.
Figure 10:
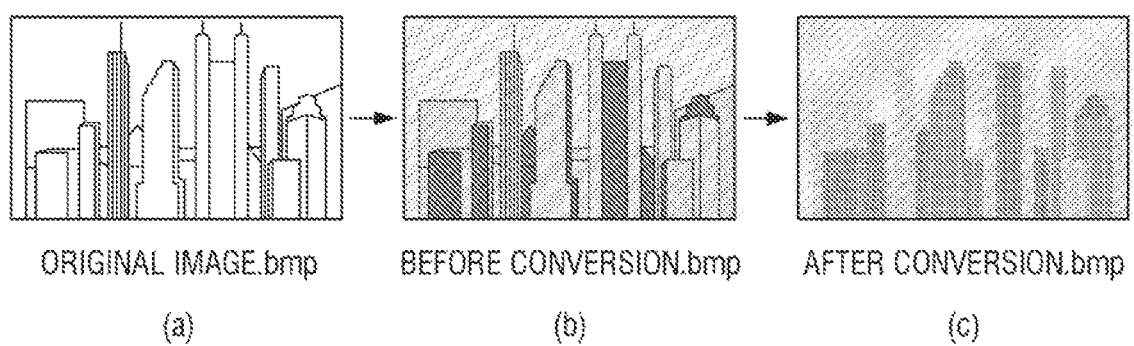
FIG. 10 is a diagram illustrating a process of converting and compressing an input image by using a lookup table and a compression mode according to an embodiment of the disclosure.

FIGS. 9 and 10 describe an example of converting and compressing an input image by using a lookup table and a compression mode according to an embodiment of the disclosure.

To be specific, FIG. 9 is a flowchart illustrating a method of an electronic device compressing an image according to an embodiment of the disclosure.

The electronic device 100 may input an image into an artificial intelligence model in the electronic device 100, and acquire a feature map corresponding to the image at operation S910. Also, the electronic device 100 may determine the type to which the feature map belongs, through distribution of the pixel values of the feature map. As an example, the electronic device 100 may divide the variation range of pixel values in a predetermined number, and identify the number of pixels included in the first range, the number of pixels included in the second range, etc. Then, the electronic device 100 may identify the type of the feature map based on the identification result. As an example, if pixels in the largest amount are included in the pixel values from 0 to 30, and pixels in the second largest amount are included in the pixel values from 195 to 255, the electronic device 100 may identify the feature map as the first type. However, this is merely an example, and the electronic device 100 may identify a type of a feature map according to various standards. For example, the electronic device 100 can identify a type of a feature map based on the average value of the entire pixels and the pixel value with the highest frequency.

Then, the electronic device 100 may convert the feature map through a lookup table corresponding to the type of the feature map at operation S920. The feature map converted through a lookup table may be converted in a one-to-one correspondence so that the distribution of the pixel values is improved or optimized for compression, as described above. Also, the electronic device 100 may compress the feature map through a compression mode for optimally compressing the converted feature map at operation S930.

In this case, the lookup table and the compression mode may have been determined by training an artificial intelligence model inside the electronic device 100, or received through the communicator being determined at the server 200. The method of receiving the lookup table and the compression mode through the server 200 will be described with reference to FIG. 11.

Meanwhile, FIG. 10 is a diagram illustrating an image before the image is converted through a lookup table, and the image after conversion according to an embodiment of the disclosure.

Referring to FIG. 10, in a feature map (b) in FIG. 10 for an input image in (a) of FIG. 10, the standard deviation of the grayscale distribution of the pixels inside the image is large on the whole, before the image is converted through a lookup table. However, in case the electronic device 100 converts the feature map through a lookup table corresponding to the type of the acquired feature map, a converted feature map (c) in FIG. 10 in which the grayscale difference inside the image has decreased on the whole can be acquired.

FIG. 11 is a sequence diagram illustrating a method of compressing a feature map through a system including a server and an electronic device according to an embodiment of the disclosure.

Referring to FIG. 11, the server 200 may train an artificial intelligence model through a plurality of input images. The process of training an artificial intelligence model by the server 200 may be a process of setting a weight or a convolution filter so that a desired result may be output when a specific image is inputted into the artificial intelligence model. That is, the server 200 may gradually adjust a weight or a convolution filter that enables deriving of a desired result as described above, by inputting a plurality of input images. Also, the server 200 may acquire learning feature maps for each of the plurality of input images for training an artificial intelligence model at operation S1110. The server 200 may analyze histograms corresponding to the acquired learning feature maps at operation S1120, and acquire a database for determining the types of the learning feature maps based on the result of the analysis. That is, the server 200 may acquire histogram information for a plurality of learning feature maps for a plurality of images, and a database for the plurality of learning feature maps.

The server 200 may determine the types of feature maps based on the database. Also, the server 200 may determine a lookup table and a compression mode for effectively compressing the feature maps according to each of the types of the feature maps at operation S1130. That is, the server 200 may analyze histograms for a plurality of learning images and determine the types of a plurality of feature maps, and may determine a lookup table and a compression mode showing the maximum compression efficiency for each of the types of the feature maps.

Meanwhile, the server 200 may transmit information on 'the lookup table and the compression mode for each of the types of the feature maps' that were determined based on the information acquired in the process of training an artificial intelligence model to the electronic device 100 at operation S1140. Here, the lookup table determined at the server 200 may be a lookup table generated such that the maximum residual among pixel values of a plurality of pixels included in the feature map is decreased, by analyzing the histogram information of the learning feature map. Meanwhile, the server 200 may transmit information on the weight value and the filter value of the artificial intelligence model that was trained to output a desired result when an image is input to the electronic device 100.

The electronic device 100 may store information on the lookup table and the compression mode for each of the types of the feature maps received from the server 200 in the memory 110. Afterwards, when an image is input into the artificial intelligence model trained at the server 200, the electronic device 100 may acquire a feature map for the image by inputting the image into a first layer at operation S1150, and determine the type of the acquired feature map. Here, the first layer may be a convolution layer that pads an adjacent value of the input image to a specific value, and performs convolution with a predetermined stride by using the convolution filter of the artificial intelligence model trained at the server 200.

The electronic device 100 may determine a lookup table and a compression mode corresponding to the type of the feature map acquired as a result of convolution with respect to the input image. Here, the electronic device 100 may read information on the lookup table and the compression mode corresponding to the determined type of the feature map from the memory 110, and compress the feature map based on the read lookup table and compression mode at operation S1160.

That is, the electronic device 100 may acquire a feature map wherein the maximum residual among a plurality of pixel values has decreased, by converting the feature map such that the standard deviation of the overall distribution of the pixel values included in the feature map decreases through a lookup table corresponding to the type of the feature map received from the server 200.

According to an embodiment of the disclosure, the electronic device 100 may convert a feature map such that a pixel having a pixel value with a high frequency among a plurality of pixels included in the feature map corresponds to a value close to a median value of a variation range of the pixel values of the plurality of pixels through a lookup table. However, this is merely an example, and the electronic device 100 may convert the feature map such that the other pixels correspond to a value which is close to a pixel value with a high frequency among the plurality of pixels included in the feature map.

In addition, the electronic device 100 may predict the value of each of the pixels based on the value of at least one pixel adjacent to each of the pixels among a plurality of pixels included in a converted feature map, and decrease the value of each of the pixels as much as the predicted value. To be specific, the electronic device 100 may predict the value of each of the pixels according to the calculation method included in a compression mode, based on the information on a compression mode for optimally compressing the converted feature map. Afterwards, the electronic device 100 may store only the differential values or the residuals between the value of each of the pixels and the predicted value, and may thereby compress the converted feature map while reducing the storage capacity for the feature map.

Meanwhile, in the aforementioned embodiment, it was described that the electronic device 100 compresses a feature map converted through a lookup table through a specific compression mode. However, the electronic device 100 may also compress a feature map that was not converted through a lookup table through a compression mode corresponding to the feature map. That is, in case information on a lookup table corresponding to a feature map inside the electronic device 100 does not exist, the electronic device 100 may compress the feature map only with a compression mode corresponding to the feature map.

Further, in case information on a compression mode corresponding to a feature map does not exist, the electronic device 100 may compress the feature map through a compression mode corresponding to a similar feature map. This will be described with reference to FIG. 13.

Meanwhile, according to the aforementioned embodiment, the electronic device 100 may already have stored 'a lookup table and a compression mode for each of the types of the feature maps' before receiving input of an image. However, this is merely an example, and the electronic device 100 may request the server 200 in real time to transmit a lookup table and a compression mode corresponding to the acquired feature map after receiving input of an image.

A training process of an artificial intelligence model is relatively complex and requires a large amount of operation compared to an application process. Meanwhile, even though an application process is relatively simple and requires a small amount of operation, the process should be performed by a user every time. Thus, as illustrated in FIG. 11, a training process of an artificial intelligence model may be performed through a server 200 in which restriction on the processing capacity is small, and an application process of an artificial intelligence model may be performed through an electronic device 100 which is capable of easily interacting with a user. That is, through the aforementioned embodiment, there is an effect that a training process and an application process of an artificial intelligence model can be performed through appropriate environments, respectively.

Meanwhile, in the aforementioned embodiment, it was described that the server 200 performs a training process of an artificial intelligence model. However, this is merely an example, and a training process of an artificial intelligence model may be performed by inputting a plurality of images to another external electronic device or the electronic device 100.

Figure 12A:
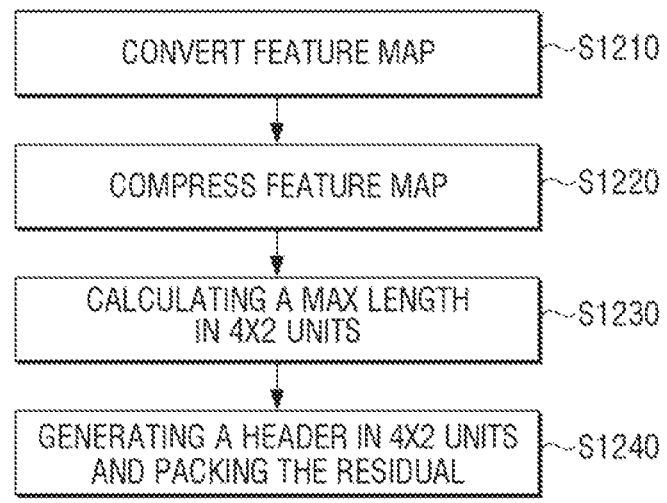
FIG. 12A is a flowchart illustrating a method of encoding and decoding a feature map according to an embodiment of the disclosure.
Figure 12B:
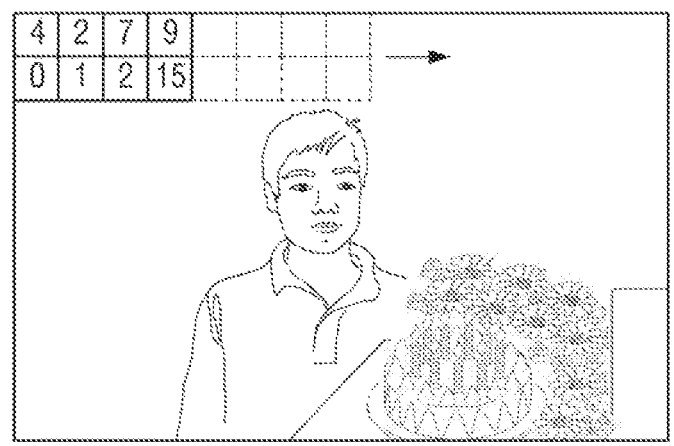
FIG. 12B is a diagram illustrating a process of encoding and decoding a feature map according to an embodiment of the disclosure.
Figure 12C:
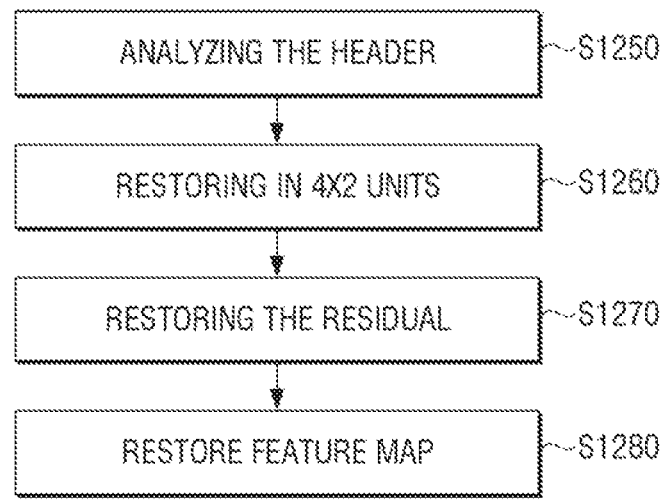
FIG. 12C is a flowchart illustrating a method of encoding and decoding a feature map according to an embodiment of the disclosure.

FIGS. 12A to 12C are diagrams for illustrating a process in which an electronic device encodes and decodes a feature map according to an embodiment of the disclosure.

To be specific, FIG. 12A is a flowchart illustrating a process in which an electronic device encodes an acquired feature map. As described above, the electronic device 100 may acquire feature maps for images by inputting images into a first layer of an application based on an artificial intelligence model in the electronic device. Then, the electronic device 100 may convert the plurality of acquired feature maps by using lookup tables (LUTs) corresponding to the types of the feature maps stored in the memory 110 at operation S1210. When converting the feature maps through lookup tables corresponding to the feature maps, the electronic device 100 may acquire feature maps that are converted to a state in which the standard deviation of the overall distribution of the pixel values of a plurality of pixels included in the feature maps has decreased or is minimized.

The electronic device 100 may compress the converted feature maps through compression modes (PMODEs) corresponding to the types of the feature maps stored in the memory 110 at operation S1220. As another example, the electronic device 100 may perform compression on the converted feature map based on each of the plurality of compression modes, and identify a compression mode corresponding to the highest compression rate. Then, the electronic device 100 may predict the predicted value of the value of each of the pixels according to the calculation formulae corresponding to the PMODEs, and replace the pixel value with a residual wherein the pixel value of the pixel is decreased as much as the predicted value. As described above, when compressing feature maps through specific compression modes, the electronic device 100 may acquire feature maps of which data capacity has been compressed, in a state in which the pixel value of each of the plurality of pixels included in the feature maps has been reduced. Detailed explanation in this regard will be made with reference to FIG. 12B.

According to FIG. 12B, a pixel value of a specific pixel may be replaced with a residual in which the pixel value is reduced by as much as the predicted value acquired from the pixel value of a pixel adjacent to the specific pixel. For example, a case wherein the compression mode PMODE 1 is a mode wherein the pixel value of a pixel located on the left side of the pixel is the predicted value can be assumed. If the compression mode PMODE 1 is identified as a compression mode corresponding to the type of the feature map, the electronic device 100 may replace the pixel value of the subject pixel with a residual after subtracting from the pixel value as much as the pixel value of the pixel located on the left side of the subject pixel. According to an embodiment of the disclosure, the variation range of the pixel value is from 0 to 255, but in the case of replacing the pixel value with a residual wherein the pixel value is subtracted as much as the predicted value, the pixel value may be a value from 0 to 16.

Returning to FIG. 12A, the electronic device 100 may store the compressed feature maps in the memory. Here, the memory may be memory 110 included in the electronic device 100, memory included in an external device, or memory included in an external server 200. When storing the compressed feature maps, the electronic device 100 may directly store data corresponding to the feature maps, but may also store the feature maps while grouping pixels in units of a specific number, in order to prevent unnecessary waste of storage capacity.

To be specific, the electronic device 100 according to an embodiment of the disclosure may group a plurality of pixels included in a feature map compressed according to a compression mode in unit blocks in a size of 4*2. Here, the electronic device 100 may identify a residual among the pixels (8 pixels in this embodiment) inside a block grouped in 4*2 units. As an example, the electronic device 100 may determine a block group wherein the residual is the biggest among a plurality of block groups. That is, the electronic device 100 may determine a header group having the max length among a plurality of block groups in units of 4*2 pixels at operation S1230.

When storing the compressed feature maps, the electronic device 100 may add information on the compression mode used for compression and information on the header group to the header. Here, the electronic device 100 may determine the storage unit based on the max length of the header group. To be specific, the electronic device 100 may determine a minimum storage unit capable of storing a size as much as the max length, and may store the feature maps while packing in order the residuals of the feature maps grouped based on the determined storage unit at operation S1240. Also, the electronic device 100 according to an embodiment of the disclosure may store information on the compression mode with storage capacity of 1 bit, and store information on the header group according to the max length with storage capacity of 4 bits.

According to the aforementioned embodiment, the electronic device 100 may minimize unnecessary waste of memory, by storing feature maps compressed in minimum units capable of storing a size as much as the max length. For example, in case the difference (or, the residual) among the pixel values of the pixels in the header group exists as much as a 7 grayscale, the electronic device 100 may allot only 3 bits in storing a group. As another example, if the difference (or, the residual) among the pixel values of the pixels in the header group is 15, the electronic device 100 may store the feature map in the header by allotting 1 bit of information on the compression mode and 4 bits of information on the group.

Meanwhile, the aforementioned embodiment is merely an example, and the electronic device 100 may store feature maps while grouping pixels in various pixel units such as a 2*2 unit, a 4*4 unit, etc., and may also determine storage units by various methods.

FIG. 12C is a flowchart illustrating a process in which an electronic device decodes an encoded feature map to transmit the feature map to the next layer.

After the electronic device 100 reads data corresponding to a feature map from the memory, the electronic device 100 may analyze the header included in the data at operation S1250. Then, the electronic device 100 may determine information on the storage unit based on information on the header group included in the header. The electronic device 100 may restore the structure and the pixel values of the feature map in units of 4*2 pixels, based on information on the storage unit (3 bits in the aforementioned embodiment) at operation S1260.

Further, the electronic device 100 may restore the residual of the pixel values included in the feature map based on information on the compression mode used in encoding at operation S1270. As an example, the electronic device 100 may identify the compression mode used in encoding based on information on the compression mode. The electronic device 100 may acquire a converted feature map by adding the predicted value to the residual of the pixel based on the mathematical formula corresponding to the identified compression mode, the relation between adjacent pixels, etc. Here, the converted feature map may mean a feature map in a state of having been converted as a lookup table was applied to the original feature map. Then, the electronic device 100 may restore a feature map for an input image by performing inverse conversion based on information on the lookup table used in encoding at operation S1280. As an example, in case the pixel value 0 was converted into 127 according to the lookup table used in encoding, the electronic device 100 may reconvert 127 included in the converted feature map into the pixel value 0, and perform restoration. In addition, the electronic device 100 may proceed to perform a process of an artificial intelligence model by transmitting the restored feature map to the layer of the next stage. According to the aforementioned embodiment, the electronic device 100 may efficiently store and read a feature map of which capacity has been compressed in the memory, such that there is no wasted space.

FIGS. 13A and 13B illustrate the result of compression rates using a specific lookup table and a specific compression mode for a plurality of images according to an embodiment of the disclosure.

Referring to FIG. 13A, the electronic device 100 may compress a plurality of images by using a lookup table and a compression mode corresponding to a Chicago image. FIG. 13B compares the amount of data of a feature map before compression and the amount of data of the feature map after compression in each of the layers of an artificial intelligence model. That is, it can be determined, as a result of compressing feature maps generated in each of the layers with the lookup table and the compression mode for compressing the Chicago image, the amount of data was compressed to 4.6% in the layer 0. Meanwhile, the amount of data was compressed to 9.53% in the layer 1, 36.14% in the layer 2, 17.56% in the layer 3, and 18.85% in the layer 4, and on the whole, the amount of data was compressed to 17.34%.

Meanwhile, in the case of compressing the other images, i.e., the chrysanthemum, hydrangeas, and penguins images by using the lookup table and the compression mode for compressing the Chicago image at the maximum, the amount of data was compressed to 17.39%, 17.84%, and 18.04% respectively, on the whole. Thus, the lookup table and the compression mode show the best compression rate for the Chicago image, as they are a lookup table and a compression mode for compressing the Chicago image.

However, even for a different image, compression is possible by a substantial amount if a lookup table and a compression mode generated and determined by using an artificial intelligence model are applied. Accordingly, even in case there is no sufficient database for determining the type of the feature map of an input image, the electronic device 100 may perform compression by using a lookup table and a compression mode trained through a different image.

While the disclosure has been shown and described with reference to preferred embodiments thereof, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A method of controlling an electronic device comprising:
providing an image as input into an artificial intelligence model;
obtaining a feature map for the image as output from the artificial intelligence model;
converting the feature map to a converted feature map using a lookup table corresponding to the feature map, wherein a standard deviation of pixel values of pixels of the converted feature map is less than a standard deviation of pixel values of pixels of the feature map;

compressing the converted feature map using a compression mode corresponding to the converted feature map among a plurality of compression modes; and storing the compressed feature map in a memory of the electronic device.

2. The method of claim 1, wherein the lookup table is generated such that histogram information on a learning feature map corresponding to a type of the feature map is analyzed, and a maximum residual among the pixel values of the pixels included in the feature map is decreased.

3. The method of claim 2, wherein the lookup table is a lookup table for converting the feature map to the converted feature map such that a pixel having a pixel value with a high frequency of occurrence among the pixel values of the pixels included in the feature map corresponds to a value close to a median value of a variation range of the pixel values of the pixels included in the feature map.

4. The method of claim 2, wherein the compressing comprises:

analyzing the learning feature map corresponding to the type of the feature map;

identifying the compression mode corresponding to the feature map among the plurality of compression modes; and compressing the converted feature map according to the compression mode, and wherein the storing comprises storing information on the compression mode in a header.

5. The method of claim 4, wherein the compressing further comprises:

identifying a value of at least one adjacent pixel among a plurality of pixels adjacent to each of the pixels included in the converted feature map based on the compression mode;

predicting values of the pixels included in the converted feature map by using the value of the at least one adjacent pixel; and decreasing values of the pixels included in the converted feature map by as much as the predicted values.

6. The method of claim 1, further comprising:

restoring a residual of the compressed feature map through the compression mode;

inverse converting the compressed feature map through the lookup table; and restoring the feature map by inputting the inverse converted feature map into a second layer included in the artificial intelligence model, wherein the restored feature map is identical to the converted feature map.

7. The method of claim 1, further comprising:

acquiring a plurality of pixel groups by grouping the pixels included in the compressed feature map in units of a predetermined number of pixels;

identifying a pixel group in which a bit amount is minimized after compression of pixels included in the pixel group as a header group; and identifying a number of bits corresponding to a difference of pixel values in the header group, and wherein the storing comprises storing the compressed feature map based on the number of bits.

8. The method of claim 7, wherein the storing further comprises:

storing information on the header group in a header.

9. An electronic device comprising:
memory; and
a processor configured to:
based on an image being input into an artificial intelligence model, obtain a feature map for the image as output from the artificial intelligence model;

convert the feature map to a converted feature map using a lookup table corresponding to the feature map, wherein a standard deviation of pixel values of pixels of the converted feature map is less than a standard deviation of pixel values of pixels of the feature map;

compress the converted feature map using a compression mode corresponding to the converted feature map among a plurality of compression modes; and storing the compressed feature map in the memory.

10. The electronic device of claim 9, wherein the lookup table is generated such that histogram information on a learning feature map corresponding to a type of the feature map is analyzed, and a maximum residual among the pixel values of the pixels included in the feature map is decreased.

11. The electronic device of claim 10, wherein the lookup table is a lookup table for converting the feature map to the converted feature map such that a pixel having a pixel value with a high frequency of occurrence among the pixel values of the pixels included in the feature map corresponds to a value close to a median value of a variation range of the pixel values of the pixels included in the feature map.

12. The electronic device of claim 10, wherein the processor is further configured to:

analyze the learning feature map corresponding to the type of the feature map, identify the compression mode corresponding to the feature map among the plurality of compression modes, compress the converted feature map according to the compression mode, and store information on the compression mode in a header.

13. The electronic device of claim 12, wherein the processor is further configured to:

identify a value of at least one adjacent pixel among a plurality of pixels adjacent to each of the pixels included in the converted feature map based on the compression mode, predict values of the pixels included in the converted feature map by using the value of the at least one adjacent pixel, and decrease values of the pixels included in the converted feature map by as much as the predicted values.

14. The electronic device of claim 9, wherein the processor is further configured to:

restore a residual of the compressed feature map stored in the memory through the compression mode, inverse convert the compressed feature map through the lookup table, and input the inverse converted feature map into a second layer included in the artificial intelligence model to restore the feature map, wherein the restored feature map is identical to the converted feature map.

15. The electronic device of claim 9, wherein the processor is configured to:

acquire a plurality of pixel groups by grouping the pixels included in the compressed feature map in units of a predetermined number of pixels, identify a pixel group in which a bit amount is minimized after compression of pixels included in the pixel group as a header group, identify a number of bits corresponding to a difference of pixel values in the header group, and store the compressed feature map in the memory based on the number of bits.

16. The electronic device of claim 15, wherein the processor is configured to:
store information on the header group in the memory in a header.

17. A method for training an artificial intelligence model by a server, the method comprising:
providing a plurality of learning images as input into the artificial intelligence model to be trained;
acquiring a plurality of feature maps for the plurality of learning images as outputs from the artificial intelligence model;
identifying types of the plurality of feature maps by analyzing histograms of the plurality of feature maps;
generating lookup tables corresponding to the types of the plurality of feature maps;
identifying compression modes corresponding to the types of the plurality of feature maps among a plurality of compression modes; and
transmitting information on the lookup tables and the compression modes to an external device.

18. The method of claim 17, wherein the lookup tables corresponding to the types of the plurality of feature maps are lookup tables generated such that a maximum residual among pixel values of pluralities of pixels included in the plurality of feature maps is decreased, and
wherein the compression modes corresponding to the types of the plurality of feature maps are compression modes identified for compressing the plurality of feature maps such that a bit amount after compression on the plurality of feature maps is minimized among the plurality of compression modes.

* * * * *